(12) United States Patent
Elgarat et al.

(10) Patent No.: US 9,916,228 B1
(45) Date of Patent: Mar. 13, 2018

(54) APPARATUS, METHOD, AND COMPUTER PROGRAM FOR SOFTWARE DEVELOPMENT TESTING UTILIZING ONE OR MORE MINIMAL TESTING FEATURES

(71) Applicant: Amdocs Development Limited, Limassol (CY)

(72) Inventors: Sharon Elgarat, Kibbutz Mefalsim (IL); Kathryn Ann Nankivell, Fitzroy North (AU)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/089,391

(22) Filed: Apr. 1, 2016

(51) Int. Cl.
  *G06F 9/44* (2006.01)
  *G06F 11/36* (2006.01)
(52) U.S. Cl.
  CPC .................. *G06F 11/3676* (2013.01)
(58) Field of Classification Search
  None
  See application file for complete search history.

(56) References Cited

U.S. PATENT DOCUMENTS

| | | | |
|---|---|---|---|
| 7,913,230 B2 | 3/2011 | Vikutan | |
| 8,601,441 B2 | 12/2013 | Kaulgud et al. | |
| 9,092,575 B2 | 7/2015 | Koenig et al. | |
| 2007/0038754 A1* | 2/2007 | Nunez | G06Q 10/10 709/226 |
| 2015/0020053 A1 | 1/2015 | Boden et al. | |
| 2015/0081363 A1 | 3/2015 | Taylor et al. | |
| 2015/0135158 A1 | 5/2015 | Tenev et al. | |
| 2015/0286555 A1 | 10/2015 | Neravati | |

FOREIGN PATENT DOCUMENTS

CA 2497389 A1 8/2006

* cited by examiner

*Primary Examiner* — Chuck Kendall
(74) *Attorney, Agent, or Firm* — Zilka-Kotab, PC

(57) ABSTRACT

An apparatus, method, and computer program product are provided for software development testing utilizing one or more minimal testing features. An acceptance testing system receives one or more first minimal testing features for a first software development component to be developed by a first provider, and one or more second first minimal testing features for a second software development component to be developed by a second provider. Before completion of the second software development component, it is determined whether the first software development component is complete. If it is determined that the first software development component is complete, testing is performed on the first software development component utilizing the one or more first minimal testing features, before the completion of the second software development component.

18 Claims, 6 Drawing Sheets

APPARATUS, METHOD, AND COMPUTER PROGRAM FOR SOFTWARE DEVELOPMENT TESTING UTILIZING ONE OR MORE MINIMAL TESTING FEATURES

FIELD OF THE INVENTION

The present invention relates to software development testing, and more particularly to agile software development testing.

BACKGROUND

Customers within the world of software development require prompt value and safe, properly tested software products. In response to this challenge, many development teams have moved to an "agile" code delivery model in which a full scope of a project is broken down into several "code drops." The definition of each drop is either determined by the customer based on business value, or is defined by developers who consider mainly criteria that makes it simple for them to deliver code in an expedited manner.

For relatively small projects, a single code provider can define the code drops as meaningful packages. On the other hand, for relatively larger, more complex projects, multiple code providers are typically required to deliver a solution. When each of such providers tries to define their own code drops, the software delivered to an acceptance testing organization does not necessarily exhibit any business value, since the delivered drops are not synchronized between providers. Further, as a result of such lack of synchronization, a first code provider may produce first code in accordance with a first timetable (by T=1), while a second code provider may produce second code in accordance with a second timetable (by T=2, after T=1). Thus, by virtue of the fact that both the first code and the second code must be delivered before testing can begin, final production code cannot be delivered to the customer until the completion of later-delivered second code.

There is thus a need for addressing these and/or other issues associated with the prior art.

SUMMARY

An apparatus, method, and computer program product are provided for software development testing utilizing one or more minimal testing features. An acceptance testing system receives one or more first minimal testing features for a first software development component to be developed by a first provider, and one or more second first minimal testing features for a second software development component to be developed by a second provider. Before completion of the second software development component, it is determined whether the first software development component is complete. If it is determined that the first software development component is complete, testing is performed on the first software development component utilizing the one or more first minimal testing features, before the completion of the second software development component.

DETAILED DESCRIPTION

Figure 1:
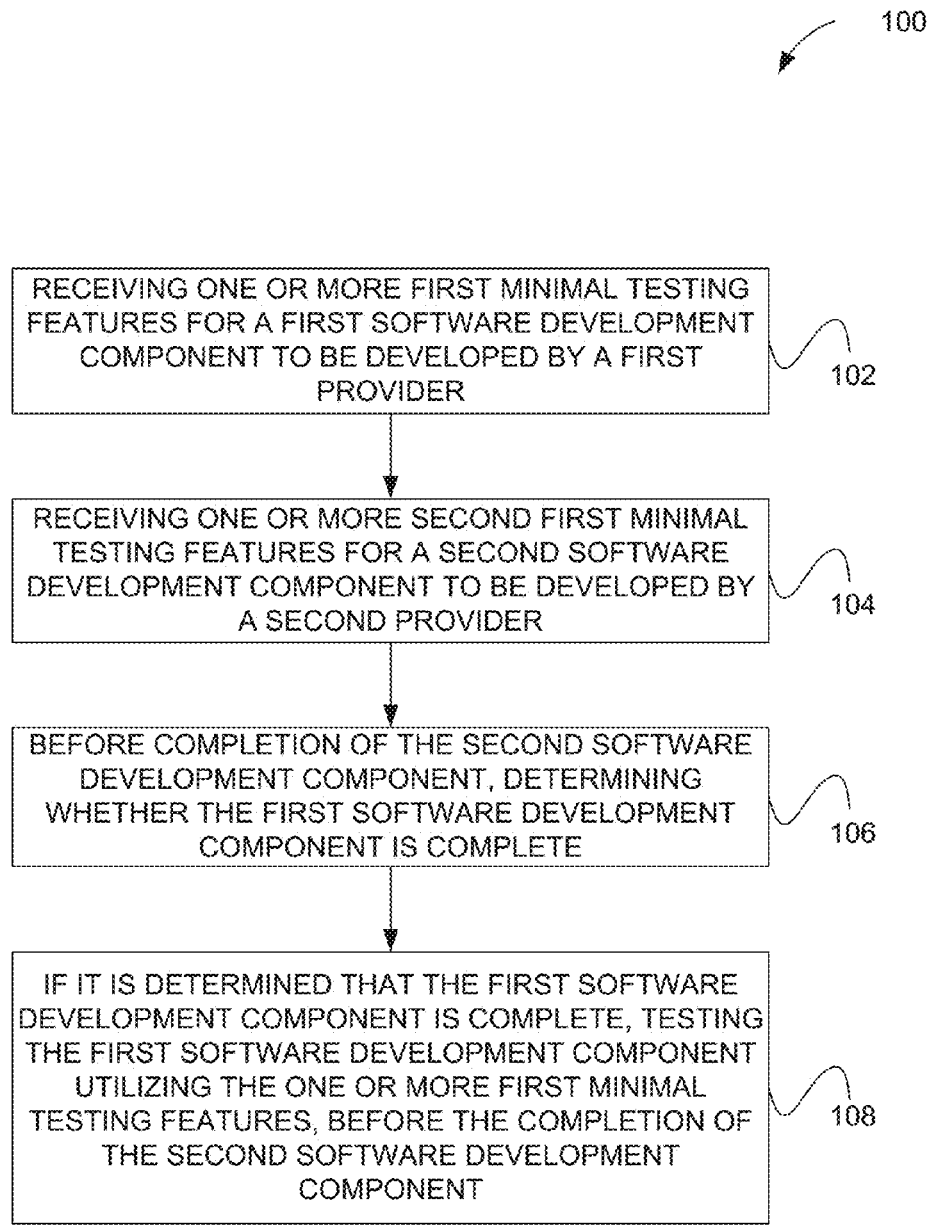
FIG. 1 illustrates a method for software development testing utilizing one or more minimal testing features, in accordance with one embodiment.

FIG. 1 illustrates a method 100 for software development testing utilizing one or more minimal testing features, in accordance with one embodiment. As shown, in operation 102, one or more first minimal testing features are received for a first software development component to be developed by a first provider. Further, per operation 104, one or more second first minimal testing features are received for a second software development component to be developed by a second provider.

In the context of the present description, each software development component may refer to any code part (e.g. element of software, etc.) that is capable of being developed as part of a larger software application. Further, each provider may include any entity (e.g. one or more individuals, corporations, organizations, vendors, etc.) that is capable of code development. Thus, in one embodiment, the first provider may include a first internal software developer team and the second provider may include a second internal software developer. In other embodiments, the first provider may include a first corporate vendor and the second provider may include a separate second corporate vendor. Of course, it is contemplated that the providers may include any similar or different types of entities, as defined above.

Also in the context of the present description, the first and second minimal testing features refer to any data and/or data structure that describe one or more features of a corresponding software development component, where such data and/or data structure is defined for enabling testing of one corresponding software development component before another corresponding software development component is complete. In the context of the present description, a software development component may be deemed complete in any desired manner that results in the software development component being ready for testing. For example, such software development component may be deemed complete (i.e. ready for testing, etc.) when certain aspects of a software application (or even the component at hand) are complete, while some are not. As we soon become apparent, by virtue of such design, testing of certain software development components of an overall software application may be performed before completion of other software development components of the overall software application, thereby enabling (optional) delivery thereof to a customer and/or other interested party.

Still yet, in varying different embodiments, the aforementioned one or more minimal testing features may be defined in a variety of ways. For example, in one embodiment, the one or more minimal testing features may be based, at least in part, on one or more minimal market features (MMFs) and/or input from an acceptance testing entity. In other embodiments, the one or more minimal testing features may be defined so as to avoid interdependence between the testing utilizing the one or more minimal testing features, and testing utilizing the one or more second minimal testing features. Still yet, the one or more minimal testing features may be defined for a smallest testable software component, at an end-to-end solution level, and/or based on a predetermined priority. More information regarding various optional aspects of the definition of minimal testing features will be set forth during the description of subsequent embodiments.

In use, the aforementioned minimal testing features are received by an acceptance testing system. Such system may include any hardware and/or software that is capable of acceptance testing which, in turn, may involve any testing that is designed to precede delivery of the software application and/or parts thereof. In various embodiments, the minimal testing features may be received in any desired manner. For example, in one embodiment, the minimal testing features may be received via a graphical user interface by a testing professional, a customer, and/or any other entity, for that matter.

To this end, in operation 106, it is determined whether the first software development component is complete. Further, this determination occurs before the second software development component is complete. In various embodiments, the aforementioned determination may be accomplished in any manual and/or automated manner that results in an indication that the first software development component is complete.

If it is determined that the first software development component is indeed complete in operation 106, testing is performed on the first software development component utilizing the one or more first minimal testing features, before the completion of the second software development component. See operation 108. Strictly as an option, in addition to the testing, the first software development component may be delivered, as well.

It should be noted that each minimal testing feature(s) may be utilized in any desired manner to test the corresponding software development component(s). For example, in one embodiment, the testing may involve a determination whether the corresponding software development component(s) exhibit a particular feature described by the corresponding minimal testing feature(s). More information regarding various optional aspects of testing utilizing the minimal testing features will be set forth during the description of subsequent embodiments.

In one embodiment, the foregoing testing may be performed by the same acceptance testing system (or portion thereof) that received the associated minimal testing features, while, in other embodiments, the various operations described herein may be more distributed in nature (e.g. performed by different, possibly remote, parts of the same or different system(s), etc.). Further, after the completion of the second software development component, such component may be tested, as well, utilizing the one or more second minimal testing features. Even still, such testing of the second software development component may include re-testing at least one aspect of the first software development component (e.g. its interoperability with the first software development component, etc.).

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described. For example, an ownership of at least one of the first device and/or the second device may be changed, in various embodiments.

Figure 2:
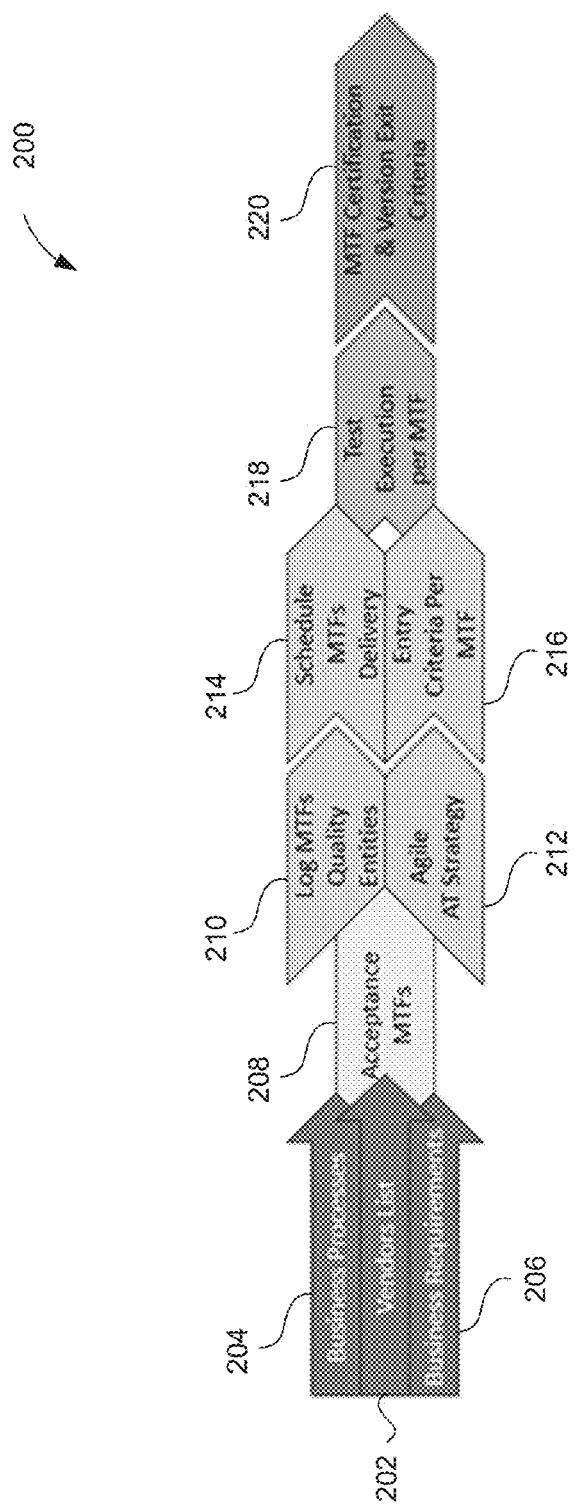
FIG. 2 illustrates a method for software development testing, in accordance with one embodiment.

FIG. 2 illustrates a method 200 for software development testing, in accordance with one embodiment. As an option, the method 200 may be implemented in the context of the details of FIG. 1 and/or any subsequent figure(s). Of course, however, the method 200 may be implemented in the context of any desired environment. Further, the aforementioned definitions may equally apply to the description below.

As shown, the method 200 begins with the receipt of a vendor list 202, as well as business processes 204 and business requirements 206. The vendor list 202 may include a list of all vendors that are to be developing different components of a software application. Further, the business processes 204 may involve any processes that are to be performed by the corresponding software components, and the business requirements 206 may include any requirements (e.g. criteria, rules, features, etc.) associated with the aforementioned processes.

For example, in one strictly optional embodiment, the vendor list 202 may include a first vendor and a second vendor that are to develop to different components of a software application designed to set up new customers with a network service. Further, the business processes 204 may detail the coordinated, ordered steps of such set up process, while the business requirements 206 may outline business rules (e.g. if-then rules, etc.) that are to be carried out during each of the coordinated, ordered steps of the set up process.

With this input, the acceptance testing minimal testing features (MTFs) 208 are defined. As mentioned earlier, these MTFs 208 may be defined in any desired manner that enables one component of the software application developed by the first vendor in the vendor list 202 to be tested (and possibly even delivered) prior to completion of another component of the software application developed by the second vendor in the vendor list 202. More information will now be set forth regarding various optional aspects of MTF definition.

In use, the MTF definition may be performed by a testing expert (or anybody else) who knows a business of the customer, desired product features, and/or a target of the overall related project. For example, in one embodiment, the MTF definition process may involve the testing expert "sitting in" on scoping sessions, document and business logic decisions, and generating the MTFs 208, while partially reviewing the same with customer business representatives during such sessions. As another example, the MTF definition process may involve the testing expert collecting all necessary elements, compiling the scope, grouping them, and defining the MTFs 208 which can be mapped to all scoping entities without necessarily leaving gaps therebetween.

In various optional embodiments, various criteria may guide the testing expert while defining the MTFs 208. For example, business value may be taken into account such that the MTFs 208 provide clear business value, or may even be mapped to one or more business processes. Still yet, testability may be taken into account such that the MTFs 208 may be made of functions and processes which can be tested at an acceptance testing level, and produce clear results which can be compared to customer requirements. Even still, the MTFs 208 may be defined to be autonomic. In other words, one or more of the MTFs 208 may be delivered as a standalone unit to production, and may depend on previous MTF delivery, but not necessarily on parallel delivered items which are not in the MTF scope.

In still other optional embodiments, the definition of the MTFs 208 may ensure minimal scope. For instance, one or more of the MTFs 208 may be defined as a smallest element in the scope, which still meets a MTF definition. Still yet, MTFs 208 may be defined to be "end-to-end", whereby one or more MTFs 208 are defined on an end-to-end solution level. In other words, the MTFs 208 may be mapped clearly to the systems it effects, the interfaces it requires, and/or the functionality it includes. Even still, the MTFs 208 may be defined to be complete, such that the entire list of MTFs 208 covers an entire scope of a release. In other words, each of the elements compiling the scope (e.g. customer requirements, business requirements, interfaces, etc.) may be mapped to at least one of the MTFs 208. In still other embodiments, the definition of the MTFs 208 may be product oriented, such that scope areas which are impacted by a product should use the product as the key entity around which the MTF 208 is defined. In such embodiment, specifications may include at least one BRT implementation required for the MTF 208. To this end, the definition of each MTF 208 may be targeted to ensure the ability to conduct a meaningful acceptance test with proper business value, but also achieve other points, as well.

With continuing reference to FIG. 2, quality entities associated with the MTFs 208 are logged in operation 210, so that an agile testing strategy may be compiled in operation 212. Further, delivery of the defined MTFs 208 by the appropriate corresponding vendor in the vendor list 202 is scheduled in operation 214, so that criteria entry may be accomplished by the appropriate vendor in operation 216. Once the component(s) is received from at least one of the vendors, testing may commence regardless as to whether the other component(s) are entered. See operation 218.

In one possible embodiment, the adoption of an agile-type development may impact the strategy in operation 210 in a variety of ways. For example, in connection with the operation 216, the MTF definition may allow the direction of vendor delivery groups to a particular level of quality with each drop, regardless of the fact that testing may have started for other MTFs 208. Another example of strategy impact may be found in accumulative regression strategy. Such definition may ask the testing team to constantly translate key flows of each MTF 208 to regression tests, manual or automatic, and continue executing them as part of the validations of the next delivered MTF(s) 208.

Further, various principles may or may not be followed. For example, roles and responsibilities for all those involved in the delivery of MTF(s) 208 may include collaboration responsibilities meant to ensure no entity (e.g. vendor, etc.) will deliver software which may impact the ability to test the MTF(s) 208 and all entities will align delivery dates to deliver an employee-to-employee MTF(s) 208. Still yet, entry criteria quality gating may be defined at two levels. For example, one level may define the start of acceptance testing, and another level may define the handover of an MTF(s) 208 to testing. While the start of acceptance testing is a quality standard for a project, and may include strict measurements, the MTF(s) 208 handover may involve operative measurements only, aimed to focus testers on MTF(s) 208 which are at a quality high enough to permit the start of testing. As additional examples, a defect lifecycle and service level agreement may be defined to clearly set expectations for vendors to focus in terms of fixing what is needed to certify each MTF(s) 208 on-time. Further, test data requests may include specific definitions for business reference tables (BRT) of the implementation each MMF requires (as part of delivery). Still yet, a request for test environments may include resources which support, in parallel, the following objectives in Table 1.

TABLE 1

| |
|---|
| Sanity gate validation of MTF(s) 208 |
| Tests of MTF(s) 208 which require a fully integrated system |
| Tests of MTF(s) 208 which require specifically customized integrated systems |
| Tests of MTF(s) 208 which can be validated on a single system without external integration |

Even still, in additional embodiments, more principles may or may not be followed, as well. For example, deployment of an MTF(s) 208 to an environment may be done only after consultation with involved vendors if the deployment will not prevent tests of already-deployed MTF(s) 208. A MTF(s) delivery procedure may be defined to ensure that involved vendors are updated upon a change in the delivery of an MTF(s) 208 by any of its vendors. Further, certification criteria may be defined for each MTF(s) 208 separately based on a size and centricity of the scope included within the MTF(s) 208. Further, additional version level exit criteria may be defined for the entire version according to the overall scope of the project at the production date. Steps related to a production readiness, such as production design requirements, may only be specified in the version exit criteria, as they will be conducted only prior to going live and not as part of a single MTF certification.

Referencing FIG. 2 again, MTF certification may be completed, based on the testing of operation 218, and it may also be confirmed that version exit criteria are met. See operation 220. The test execution of an MTF(s) 208 may be performed based on designed test ware. Such tests can be run manually or automatically, and may include validations for all test types including, but not limited to functionality, usability, integration, performance, operation, comparison, etc. The test reports within a acceptance testing period may present both high level project progress information and single MTF progress information. This may allow improved clarity of the business status and the ability to deliver value to production, at any given point in the project. During the test execution of MTF training, groups may work in parallel to prepare relevant user guides, training sessions, and any other material required for the customer to be able to operate the system should they choose to deploy the MTF(s) 208 into production.

Regardless as to whether the project is split in smaller versions per MTF(s) 208 or remains a single large project with a single version end date, the testing team may continue to conduct extended regression tests, while testing progresses and each MTF(s) 208 is certified. This may ensure project level changes (e.g. implementation changes, architecture changes, etc.) do not impact the certification of the MTF(s) 208. Ongoing dedicated management attention may be managed to follow up on possible impacts to certified MTF(s) 208 as a result of project level changes. At the end of the version, an additional quality gate, namely the exit criteria, may be measured to make sure the version can go live as a full version. It may, in some embodiments, include the certification of all MTF(s) 208, but may also contain production readiness activities such as dress rehearsal and final implementation certification, which are not necessarily conducted at a single MTF(s) 208 level (but at a version level only).

Figure 3:
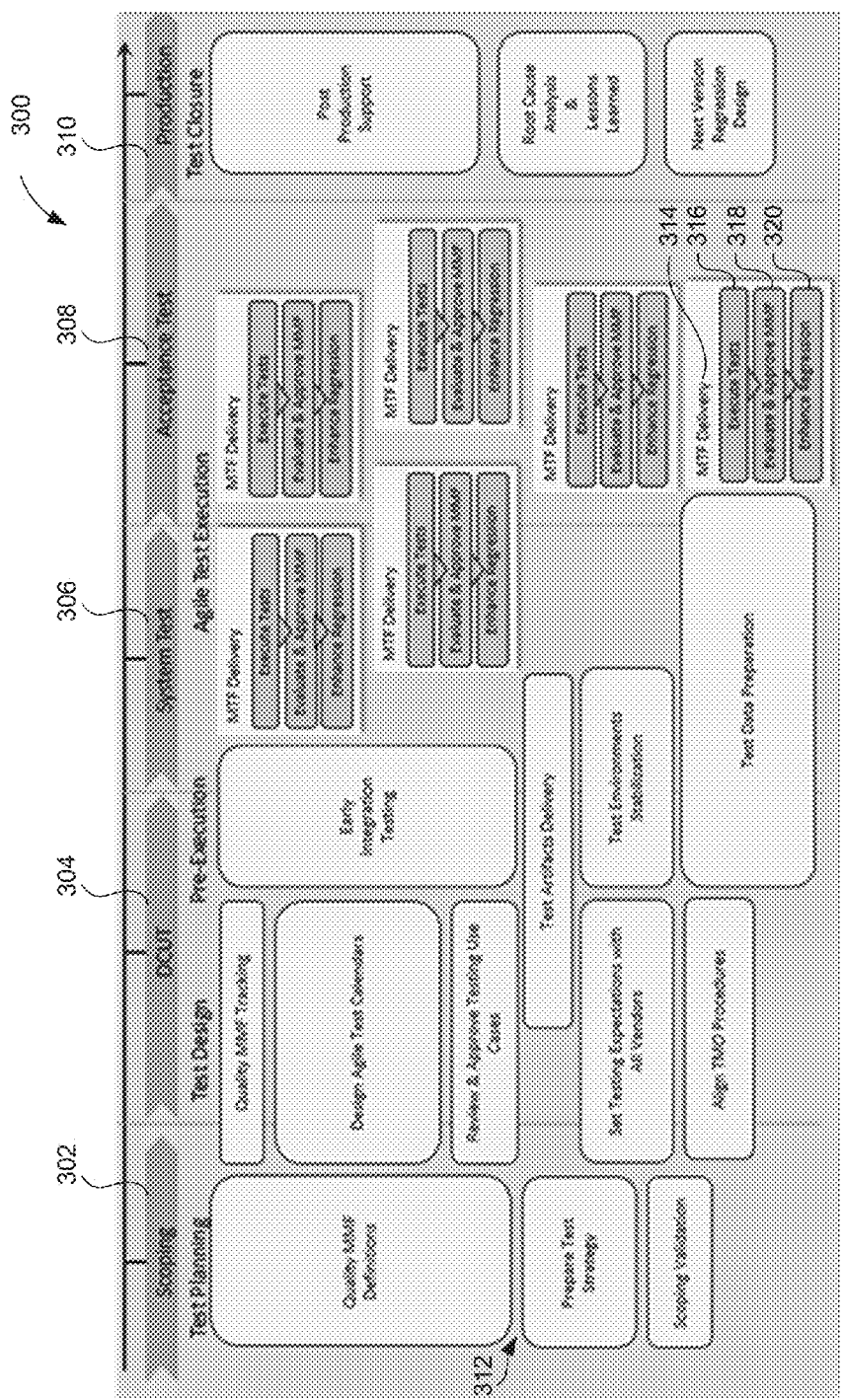
FIG. 3 illustrates an exemplary framework for software development testing, in accordance with an automated embodiment.

FIG. 3 illustrates an exemplary framework 300 for software development testing, in accordance with an automated embodiment. As an option, the framework 300 may be implemented in the context of the details of previous and/or any subsequent figure(s). Of course, however, the framework 300 may be implemented in the context of any desired environment. Further, the aforementioned definitions may equally apply to the description below.

As shown, the framework 300 includes various stages including a scoping stage 302, a development cut (DCUT) stage 304, a system test stage 306, an acceptance stage 308, and a production stage 310. Further, each of the aforementioned stages includes a plurality of stage parts 312 that represent specific techniques that are applied at the corresponding stage. For example, the system test stage 306 and the acceptance stage 308 both include a plurality of MTF deliveries 314 that each involve the execution of tests 316 on particular components (based on the corresponding MTF(s)), evaluation and approval of MMF(s) 318, and an enhance regression step 320. The latter step 320 may, in one embodiment, involve scanning other components (or features thereof) that were already approved, and making sure that such other components are still working properly.

Figure 4:
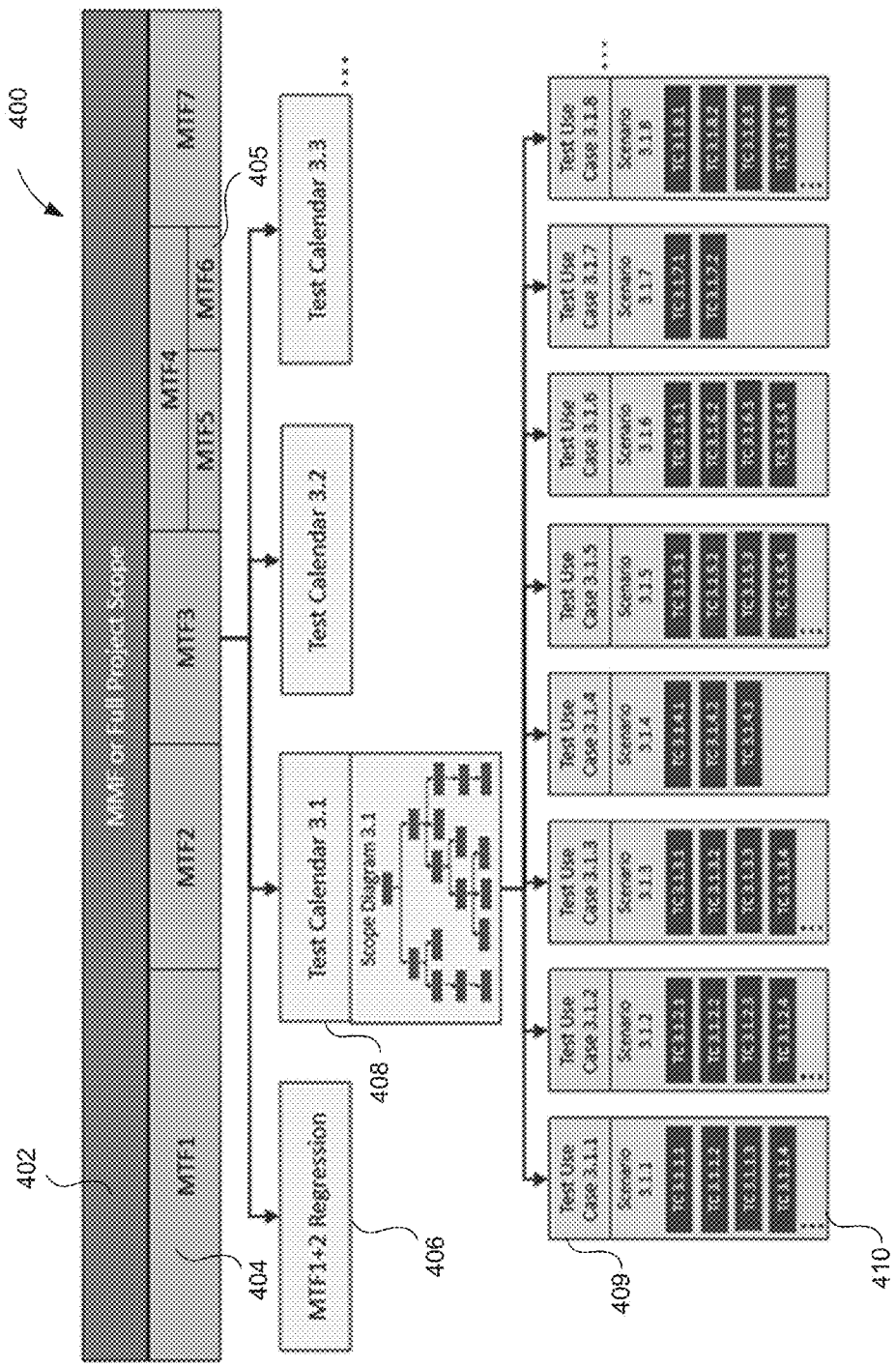
FIG. 4 illustrates an exemplary minimal testing feature (MTF) definition framework for use during software development testing, in accordance with an automated embodiment.

FIG. 4 illustrates an exemplary minimal testing feature (MTF) definition framework 400 for use during software development testing, in accordance with an automated embodiment. As an option, the MTF definition framework 400 may be implemented in the context of the details of previous and/or any subsequent figure(s). Of course, however, the MTF definition framework 400 may be implemented in the context of any desired environment. Further, the aforementioned definitions may equally apply to the description below.

As shown, the MTF definition framework 400 is based on a MMF or full project scope 402 and comprises a plurality of MTFs 404. One more of such MTFs 404 may even include some dependent MTFs 405, as illustrated. In any case, each of the MTFs 404 includes various criteria. For instance, such MTFs 404 may include regression criteria 406 that, as mentioned earlier, enables the testing of other components (or features thereof) that were already approved, to make sure that such other components are still working properly.

Still yet, the MTFs 404 may include test calendars 408 that, in turn, include a plurality of test use cases 409. Such test use cases 409 may include different test scenarios 410 that may each be applied to a particular corresponding software development component to ensure that such component is capable of operating correctly in such scenarios 410.

An exemplary use of one possible embodiment will now be described. In one example, an MMF may be defined by a customer to provide enhancements to a screen within one of their systems. The MMF may impact two vendors: 1) Vendor A who must only develop an interface to provide analytical data to a different system (estimated as two weeks development), and 2) Vendor B who must develop three sub-elements inside an existing screen, namely a) a summary of internal information from within the system, b) a capability to query additional internal details, and c) the reflection on screen of analytical data from an external system (where each of the three sub-elements is estimated as two weeks of development). As a result, the MMF timeline to integrative testing would be set as six weeks although, two weeks after it is started, Vendor A would have already completed their work and will then sit idle, waiting for Vendor B, just to find the first integrative issue.

In the context of such example, a business MMF defined by the customer may be split into two MTFs, and ordered accordingly. Specifically, a first MTF (MTF01) may contain an ability to view analytical information on the screen and therefore includes both Vendor A development and the 3rd item defined for Vendor B. Further, a second MTF (MTF02) may contain an ability to see and query internal information on the screen and therefore include the two elements developed by Vendor B. Priority may be assigned to MTF01 as it allows one to verify and certify the development of Vendor A and raise early integrative issues which could not necessarily be found by internal tests of each vendor. Further, MTF01 would most probably not be approved by the customer to production, as the screen still lacks the internal system's information, however, should Vendor B face severe issues with the internal development, the customer could still have the ability to decide if the analytical information provides sufficient value to deploy by itself.

Thus, the MTFs may, in one embodiment, originate from a testing team and, therefore, be used in projects where scoping was not done in agile. The MTFs may be used as entities determining production cycles or they may be used for accumulating certified functionality until a point where the customer is ready to go live. The reduced dependency on customer involvement and on deployment-to-production allows use of this embodiment even in multi-vendor projects for which not all involved vendors are aligned with agile methodology from the start, and in projects where the customer has not agreed to support agile cycles from the start. However, as a production date comes closer, the present embodiment may be more flexible in terms of deploying elements of the project which are certified and have business value.

Figure 5:
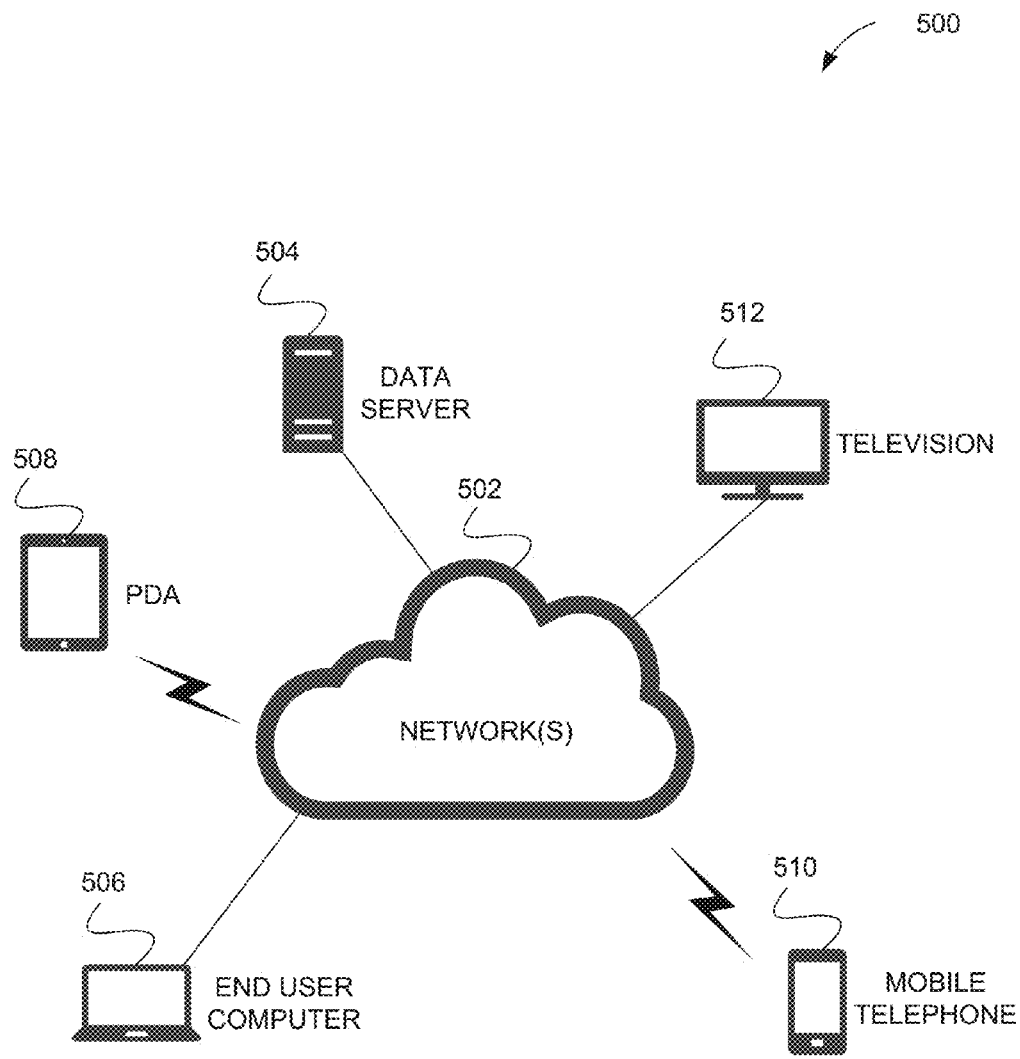
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
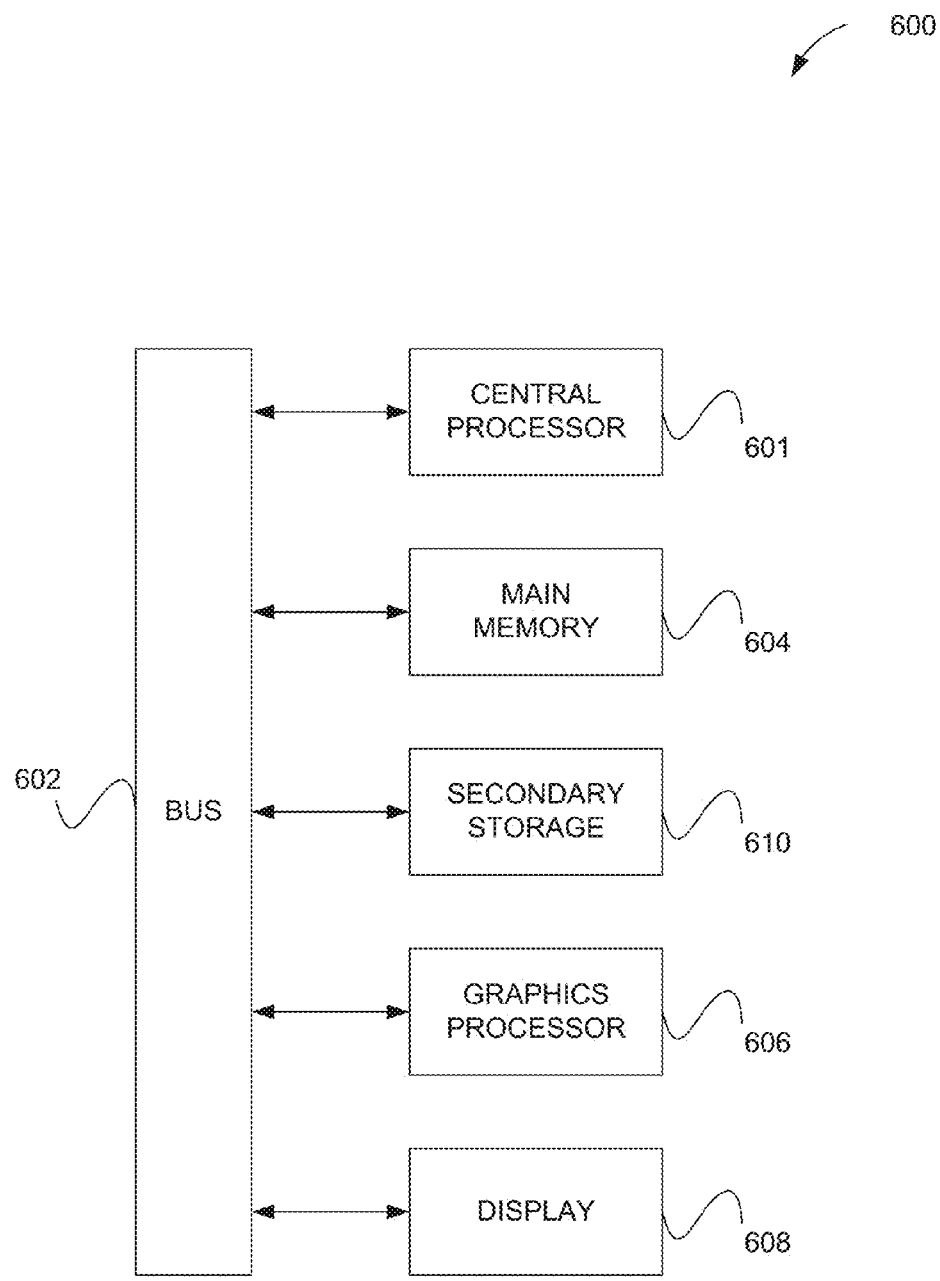
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:

receiving, by an acceptance testing system, one or more first minimal testing features for a first software development component to be developed by a first provider, utilizing at least one input device, the first software development component being a first code part of a software application;

receiving, by the acceptance testing system, one or more second minimal testing features for a second software development component to be developed by a second provider, utilizing the at least one input device, the software development component being a second code part of the software application;

before completion of development of the second software development component, determining whether development of the first software development component is complete; and when it is determined that the development of the first software development component is complete, testing, utilizing at least one processor, the first software development component utilizing the one or more first minimal testing features, before the development of the second software development component is complete;

wherein the first minimal testing features and the second minimal testing features are defined to avoid interdependence between the testing of the first software development component utilizing the one or more minimal testing features and testing of the second software development component utilizing the one or more second minimal testing features, thereby allowing the testing of the second software development component before the development of the second software development component is complete.

2. The computer program product of claim 1, wherein the computer program product is configured for, after the completion of the development of the second software development component, testing, utilizing the at least one processor, the second software development component, utilizing the one or more second minimal testing features.

3. The computer program product of claim 1, wherein the computer program product is configured for, before the completion of the development of the second software development component, delivering, utilizing at least one output device, the first software development component.

4. The computer program product of claim 1, wherein the computer program product is configured such that the one or more first minimal testing features is based, at least in part, on one or more minimal market features.

5. The computer program product of claim 1, wherein the computer program product is configured such that the one or more first minimal testing features is based, at least in part, on input from an acceptance testing entity.

6. The computer program product of claim 1, wherein the computer program product is configured such that the one or more first minimal testing features is defined for a smallest testable software component.

7. The computer program product of claim 1, wherein the computer program product is configured such that the one or more first minimal testing features is defined at an end-to-end solution level.

8. The computer program product of claim 1, wherein the computer program product is configured such that the one or more first minimal testing features is defined based on a predetermined priority.

9. A method, comprising:

receiving, by an acceptance testing system, one or more first minimal testing features for a first software development component to be developed by a first provider, utilizing at least one input device, the first software development component being a first code part of a software application;

receiving, by the acceptance testing system, one or more second minimal testing features for a second software development component to be developed by a second provider, utilizing the at least one input device, the software development component being a second code part of the software application;

before completion of development of the second software development component, determining whether development of the first software development component is complete; and when it is determined that the development of the first software development component is complete, testing, utilizing at least one processor, the first software development component utilizing the one or more first minimal testing features, before the development of the second software development component is complete;

wherein the first minimal testing features and the second minimal testing features are defined to avoid interdependence between the testing of the first software development component utilizing the one or more minimal testing features and testing of the second software development component utilizing the one or more second minimal testing features, thereby allowing the testing of the second software development component before the development of the second software development component is complete.

10. An apparatus, comprising:

one or more hardware processors for:

receiving, by an acceptance testing system, one or more first minimal testing features for a first software development component to be developed by a first provider, utilizing at least one input device, the first software development component being a first code part of a software application;

receiving, by the acceptance testing system, one or more second minimal testing features for a second software development component to be developed by a second provider, utilizing the at least one input device, the software development component being a second code part of the software application;

before completion of development of the second software development component, determining whether development of the first software development component is complete; and when it is determined that the development of the first software development component is complete, testing the first software development component utilizing the one or more first minimal testing features, before the development of the second software development component is complete;

wherein the first minimal testing features and the second minimal testing features are defined to avoid interdependence between the testing of the first software development component utilizing the one or more minimal testing features and testing of the second software development component utilizing the one or more second minimal testing features, thereby allowing the testing of the second software development component before the development of the second software development component is complete.

11. The apparatus of claim 10, wherein the apparatus is configured for, after the completion of the development of the second software development component, testing, utilizing the at least one processor, the second software development component, utilizing the one or more second minimal testing features.

12. The apparatus of claim 10, wherein the apparatus is configured for, before the completion of the development of the second software development component, delivering, utilizing at least one output device, the first software development component.

13. The apparatus of claim 10, wherein the apparatus is configured such that the one or more first minimal testing features is based, at least in part, on one or more minimal market features.

14. The apparatus of claim 10, wherein the apparatus is configured such that the one or more first minimal testing features is based, at least in part, on input from an acceptance testing entity.

15. The apparatus of claim 10, wherein the apparatus is configured such that the one or more first minimal testing features is defined for a smallest testable software component.

16. The apparatus of claim 10, wherein the apparatus is configured such that the one or more first minimal testing features is defined at an end-to-end solution level.

17. The computer program product of claim 1, wherein testing the first software development component utilizing the one or more first minimal testing features includes determining whether the first software development component exhibits a particular feature described by the one or more first minimal testing features.

18. The computer program product of claim 1, further comprising:

after testing the first software development component utilizing the one or more first minimal testing features and before the development of the second software development component is complete, deploying the first software development component for use by a customer.

* * * * *